United States Patent [19]

Appel et al.

[11] Patent Number: 5,267,531
[45] Date of Patent: Dec. 7, 1993

[54] ODOR CONTROL ANIMAL LITTER USING BISULFITE ADDITION COMPOUND

[75] Inventors: Norman J. Appel, Monroe, N.Y.; Art D. Cotton, Chicago, Ill.; Raymond J. Heinz, Northfield, Ill.; John S. Josephitis, Glen Ellyn, Ill.; Vern R. Murawski, Elmwood Park, Ill.; Gerald L. Neuser, Muskego, Wis.; Marvin L. Raymond, Cape Girardeau; Phillip B. Greene, Sikeston, both of Mo.

[73] Assignee: Golden Cat Corporation (GCC), South Bend, Ind.

[21] Appl. No.: 957,687

[22] Filed: Oct. 7, 1992

[51] Int. Cl.$^5$ .............................. A01K 29/00
[52] U.S. Cl. ..................................... 119/171
[58] Field of Search ................ 119/171, 172, 173; 71/21

[56] References Cited

U.S. PATENT DOCUMENTS 3,921,581 11/1975 Brewer .
4,638,763 1/1987 Greenberg .
4,641,605 2/1987 Gordon .
4,957,063 9/1990 Heitfeld et al. ................... 119/172
5,016,568 5/1991 Stanislowski et al. ............. 119/172
5,094,190 3/1992 Ratcliff .
5,109,805 5/1992 Baldry ............................... 119/173

FOREIGN PATENT DOCUMENTS 2-154629 6/1990 Japan ................................ 119/171

Primary Examiner—Gene Mancene
Assistant Examiner—Todd E. Manahan
Attorney, Agent, or Firm—Baker & Daniels

[57] ABSTRACT

A litter composition is disclosed and includes a particulate liquid absorbent material and a particulate odor control agent that is dry blended with the absorbent material. The odor control agent comprises a mixture of a fragrance oil that has been spray dried onto a starch carrier and a sodium bisulfite complex having volatile fragrance components. The odor control agent is present in an amount ranging between 0.025% to 0.1% by weight of the total litter composition.

4 Claims, No Drawings

ODOR CONTROL ANIMAL LITTER USING BISULFITE ADDITION COMPOUND

BACKGROUND OF THE INVENTION

The present invention relates generally to animal litters, and more particularly, to an animal litter incorporating an odor inhibiting agent.

Animal litter compositions, particularly cat litter, are well known for collecting waste products of housebroken animals. After a relatively short period of time, the waste products emit objectionable odors. In order to reduce or eliminate these objectionable odors, various fragrant additives have been developed.

In U.S. Pat. No. 3,921,581, issued to Brewer, a pet litter additive is disclosed which comprises consolidated particles that release a fragrance when contacted with moisture. The particles are primarily a solid excipient of powdered solids, including a binder and a water sensitive disintegrant. The particles also include a minor amount of a perfume fragrance, such as a floral or earth fragrance. When the particles are contacted with moisture, they immediately swell to disintegrate into a loosened mound of expanded solid, whereupon the perfume of the solids then releases a fragrance.

U.S. Pat. No. 4,407,231, issued to Colborn discloses a "scratch-activated" litter, wherein an odor masking component is released in response to agitation of the litter by the animal.

U.S. Pat. No. 4,638,763, issued to Greenberg, discloses an animal litter composition including citric acid to retard the liberation of ammonia that is normally released based upon bacterial action on excreted urea. In particular, the citric acid bonds the ammonia to the substrate of the litter. Sodium chloride is also provided to extend the capability of the citric acid.

U.S. Pat. No. 5,094,190, issued to Ratcliff, et al., discloses a litter composition comprising a boron-containing compound, which acts by either antimicrobial action or inhibiting urease. Since urease is a catalyst which breaks down urea into ammonia, the control of urease reduces the formation of ammonia.

SUMMARY OF THE INVENTION

The present invention provides an odor control additive for a litter, wherein the additive may suitably comprise, consist of, or consist essentially of a addition compound or complex of specific aldehydes or ketones.

Generally, the invention provides a litter composition comprising an absorbent material and a particulate odor control agent that is dry blended with the absorbent material. The odor control agent comprises a bisulfite complex of specific aldehydes and ketones.

More particularly, the invention provides, in one form thereof, such a liter composition, wherein the odor control agent comprises a mixture of a fragrance oil that has been spray dried onto a starch carrier and an aldehyde, a volatile fragrance component, sodium bisulfite salt. When the salt comes into contact with an acid or base, such as urine, the complex activates to release the aldehyde, which is a perfume type aromatic that masks odor, and sodium bisulfite, an inert salt. The urea in the urine decomposes into ammonia, which reacts further with the aldehyde to form an aldehydic amine, a non-odoriferous note and water.

An advantage of the litter composition of the present invention is that the odor control agent is moisture activated to release a deodorizing fragrance upon initial deposit of the urine.

Another advantage of the litter composition of the present invention is that the odor control agent continues to release and deodorize as the deposited urine breaks down and releases ammonia.

Yet another advantage of the litter composition of the present invention is that the odor control agent both neutralizes ammonia odors and masks remaining waste odors.

DETAILED DESCRIPTION OF THE INVENTION

In accordance with a feature of the present invention, there is provided a litter composition comprising a particulate absorbent material and an odor control agent. The litter composition of the present invention can be used in litter boxes or cages of household pets such as cats, hamsters, gerbils, guinea pigs, etc. In addition, the litter composition may be useful for other pets such as rabbits and ferrets, as well as laboratory animals such as rats and monkeys.

The particulate absorbent material composes the highest percentage by weight of the litter composition and may comprise mineral adsorbents such as smectite clays, zeolites, silicates, etc. The clays may be swelling clays such as sodium monmorillonite or non-swelling clays, such as calcium montmorillonite. Alternatively, the absorbent material may be non-mineral adsorbents, such as paper, wood chips, organic fiber, peanut hulls, alfalfa, bark, straw, sawdust, sand, etc.

Preferably, the absorbent material comprises a smectite clay, which is commercially available from, among others, Golden Cat Corporation under the tradename "Tidy Cat." Preferably, the size of the absorbent particles ranges from about 4 mesh (4,760 microns) to about 60 mesh (250 microns).

The odor control agent comprises a bisulfite complex prepared in the following manner. A complex proprietary blend of natural essential oils and aroma chemicals are compounded. These chemicals contain the following classes of chemicals: acetates, ketones, aldehydes, alcohols, salicylates, dimethyl and diethyl acetals, lactones, and nitro and macro musks. The above mixture is blended with heat for about two and one-half hours or until completely mixed. Additional quantities of selected aldehydes or ketones are then complexed with the bisulfite complex starting materials and refluxed for about three to four hours or until completely reacted. The pH of the complex is adjusted, and then the complex is vacuum filtered, washed with solvent, recrystallized, dried and then granulated to proper particle size. The fragrance oil is emulsified with various starches and water for a period of two hours. The emulsion is then spray dried and checked for proper oil content.

The bisulfite complex is then blended with free flowing agents until completely mixed in a proportion of about 1-25% by weight, preferably 5%. The encapsulated fragrance is also blended with other free flowing agents until completely mixed. The blended powders are then mixed together with additional free flowing agents, micro adsorbents, hydro adsorbents and sodium bicarbonate.

Once the powdered odor control agent has been prepared, it is physically mixed together in a conventional manner. For example, the appropriate amounts of each component may be added to a container, which is then agitated for a given period of time until the odor control agent particles are sufficiently interdispersed with the absorbent particles to cause the desired fragrance and deodorizing action to occur upon the deposit of urine in the litter.

Preferably, the particle size of the absorbent material ranges from about 4 mesh (4,760 microns) to about 60 mesh (250 microns). The particle size of the odor control agent ranges from about 25 microns to 100 microns, and preferably less than 75 microns. Preferably, the odor control agent is present in an amount of about 0.025% to 0.1% by weight of the total litter composition. Preferably, the agent is present at about 0.05% by weight.

The odor control agent is believed to function in the following manner. The fragrance oil that has been spray dried onto the starch carrier is activated upon contact with moisture to provide immediate masking of the urine odors. As the urine remains in the litter, bacterial and other microflora produce urease, which acts as a catalyst to break down urea into ammonia. As the pH rises, due to this reaction, the sodium bisulfite complex converts to an aldehyde and sodium bisulfite, which activates and releases the volatile fragrance components that were blended with complex. This fragrance is relatively strong to adequately mask the ammonia odors.

It is also believed that, in addition to odor masking, the present invention provides a mechanism to reduce ammonia odors. By way of illustration, a particular odor control agent may be benzaldehyde sodium bisulfate. As noted above, as the pH of the urine increases, the complex forms benzaldehyde, a fragrant aromatic, and sodium bisulfite according to the following equation:

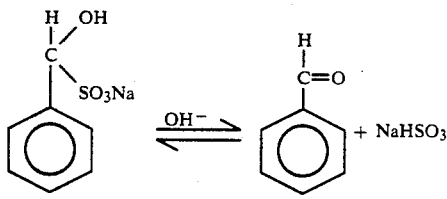
(1)

The benzaldehyde reacts with ammonia to form benzylimine and water:

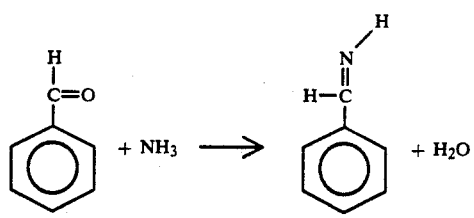

Thus, according to the present invention, the odor control agent functions to mask liquid waste odors both at initial deposit of the waste and as ammonia is formed over a period of time. In addition, the present invention provides a novel mechanism for binding the ammonia and converting it into a fragrant aromatic.

Although the sodium bisulfite of specific aldehydes has been discussed herein, the present invention includes odor control agents that incorporate the sodium bisulfite of specific ketones.

It will be appreciated that the foregoing is presented by way of illustration only, and not by way of any limitation, and that various alternatives and modifications may be made to the illustrated embodiment without departing from the spirit and scope of the invention.

What is claimed is:

1. A litter composition comprising:
   a particulate liquid absorbent material; and
   a particulate odor control agent comprising a bisulfite addition compound of one of an aldehyde and a ketone, whereby said compound converts to sodium bisulfite and one of said aldehyde and said ketone in the presence of a basic pH for masking ammonia odors.

2. The litter of claim 1, further comprising a plurality of volatile fragrance components blended with said bisulfite addition compound, whereby said fragrance components are released upon conversation of said compound into sodium bisulfite and one of an aldehyde and a ketone.

3. The litter composition of claim 1, wherein said bisulfite addition compound includes a fragrance oil spray-dried on to a starch carrier, whereby said starch carrier is activated on contact with moisture to release said oil.

4. The litter composition of claim 1, wherein said bisulfite addition compound is a benzaldehyde sodium bisulfite.

* * * * *